(12) United States Patent
Waterman

(10) Patent No.: US 11,802,399 B2
(45) Date of Patent: Oct. 31, 2023

(54) PIPE COVERING

(71) Applicant: Brent Waterman, Philadelphia, PA (US)

(72) Inventor: Brent Waterman, Philadelphia, PA (US)

(*) Notice: Subject to any disclaimer, the term of this patent is extended or adjusted under 35 U.S.C. 154(b) by 532 days.

(21) Appl. No.: 17/036,557

(22) Filed: Sep. 29, 2020

(65) Prior Publication Data

US 2022/0098848 A1    Mar. 31, 2022

(51) Int. Cl.
*E03F 7/06* (2006.01)
*F16L 55/24* (2006.01)
*B32B 1/08* (2006.01)
*B32B 15/02* (2006.01)
*F16L 5/10* (2006.01)

(52) U.S. Cl.
CPC ............... *E03F 7/06* (2013.01); *B32B 1/08* (2013.01); *B32B 15/02* (2013.01); *F16L 5/10* (2013.01); *F16L 55/24* (2013.01); *B32B 2260/046* (2013.01)

(58) Field of Classification Search
CPC ....................................... E03F 7/06; F16L 5/10
See application file for complete search history.

(56) References Cited

U.S. PATENT DOCUMENTS

| | | | | |
|---|---|---|---|---|
| 4,500,580 A | * | 2/1985 | Luciani | ................ E04F 13/08 428/537.1 |
| 5,330,811 A | * | 7/1994 | Buchalter | ............... A47K 1/06 428/137 |
| 5,581,934 A | | 12/1996 | Arnold, Sr. | |
| 5,596,834 A | | 1/1997 | Ritter | |
| 5,725,931 A | * | 3/1998 | Landin | ................ F16F 1/376 428/64.2 |
| 6,161,589 A | * | 12/2000 | Bolotte | .................. F16L 5/02 138/167 |
| 6,627,292 B1 | * | 9/2003 | Hoffmann, Sr. | .... E04G 23/0203 428/137 |
| 9,119,387 B2 | | 9/2015 | Moss | |
| 10,822,815 B1 | * | 11/2020 | Vance | .................. F16L 5/10 |
| 2006/0010595 A1 | * | 1/2006 | Ismert | .................. F16L 5/10 4/675 |
| 2006/0027388 A1 | * | 2/2006 | Collins | ................. H02G 3/22 174/663 |

(Continued)

FOREIGN PATENT DOCUMENTS

| | | |
|---|---|---|
| CN | 2896101 Y | 5/2007 |
| JP | 2005016204 A * | 1/2005 |

*Primary Examiner* — Babajide A Demuren
(74) *Attorney, Agent, or Firm* — RatnerPrestia

(57) ABSTRACT

A pipe covering assembly covers a gap defined between an exterior surface of a pipe and an opening in a wall through which the pipe extends. The pipe covering assembly includes a substrate layer having a through-hole for receiving the pipe, a front surface and a rear surface. A mesh material layer is either attached to or contained within the substrate layer. An adhesive layer is directly applied to the rear surface of the substrate layer, wherein the adhesive layer includes an adhesive that is configured to be applied to the wall and the pipe. A plurality of concentric rings are either printed on the front surface of the substrate layer or disposed on a layer that is applied to the front surface of the substrate layer, each ring of the concentric ring corresponding to a pre-determined pipe diameter.

21 Claims, 3 Drawing Sheets

(56) References Cited

U.S. PATENT DOCUMENTS

| | | | |
|---|---|---|---|
| 2006/0191237 A1* | 8/2006 | Hansen | E04F 13/04 52/746.1 |
| 2007/0126229 A1* | 6/2007 | Krowech | F16L 5/10 285/189 |
| 2008/0157518 A1* | 7/2008 | Cecilio | F16L 5/10 52/506.01 |
| 2014/0260044 A1* | 9/2014 | Gilleran | F16L 5/10 52/506.1 |
| 2021/0148489 A1* | 5/2021 | Gilstrap | F16L 5/10 |

* cited by examiner

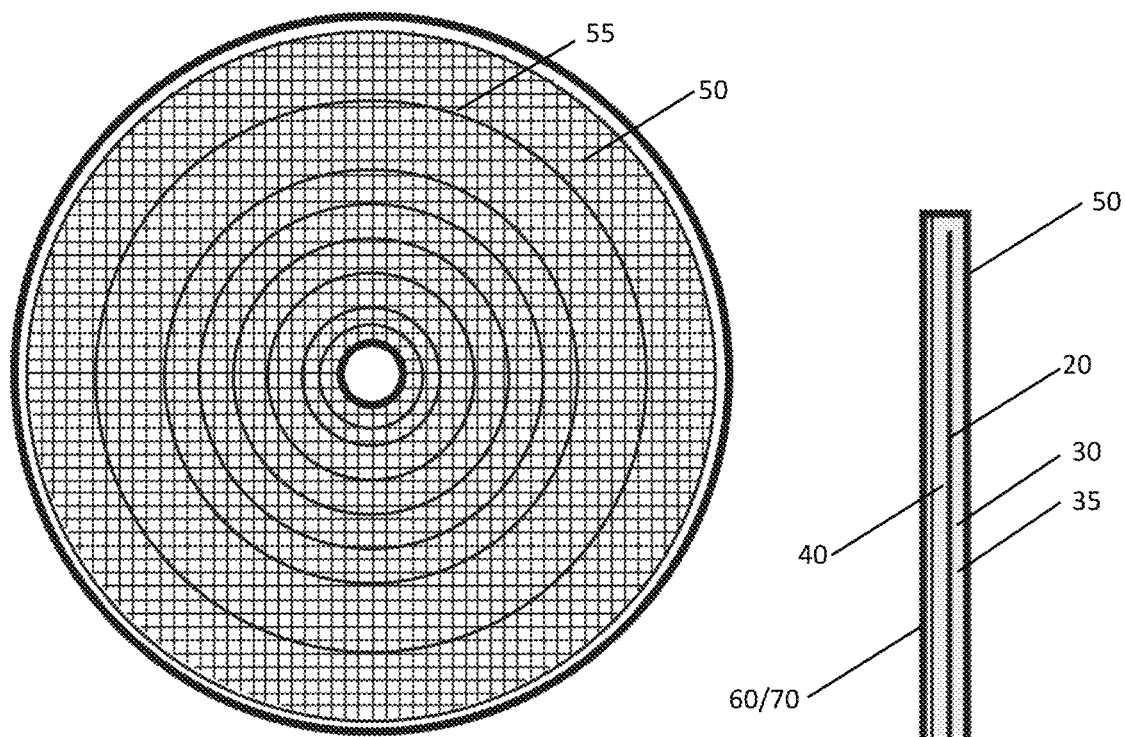
FIG. 3
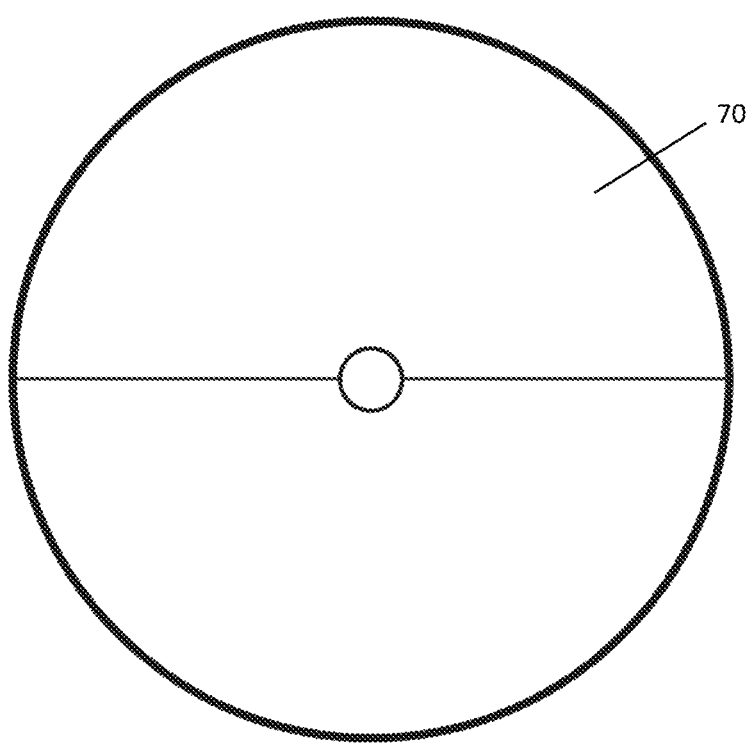
FIG. 4
FIG. 5

PIPE COVERING

FIELD OF THE INVENTION

The present invention relates to a covering for preventing entry of a rodent through an opening between a pipe and a hole in a wall (or other surface) through which the pipe extends.

BACKGROUND OF THE INVENTION

Rodents, such as mice or rats, commonly gain entry into the interior of a building by crawling through an opening between a pipe and a hole in a wall (or other surface) through which the pipe passes. It would be desirable to provide a covering over the pipe that conceals and blocks the opening in an effort to prevent rodents from gaining entry into the interior of a building by crawling through the opening.

SUMMARY OF THE INVENTION

According to one aspect of the invention, a pipe covering assembly covers a gap defined between an exterior surface of a pipe and an opening in a wall through which the pipe extends. The pipe covering assembly includes a substrate layer having a through-hole for receiving the pipe, a front surface and a rear surface. A mesh material layer is either attached to or contained within the substrate layer. An adhesive layer is directly applied to the rear surface of the substrate layer, wherein the adhesive layer includes an adhesive that is configured to be applied to the wall and the pipe. A plurality of concentric rings are either printed on the front surface of the substrate layer or disposed on a printed layer that is applied to the front surface of the substrate layer, each ring of the concentric ring corresponding to a predetermined pipe diameter.

According to another aspect of the invention, the pipe covering assembly comprises a substrate layer having a through-hole for receiving the pipe. A metallic mesh material layer is either attached to or contained within said substrate layer. An adhesive layer is directly applied to one surface of the substrate layer. The adhesive layer comprises an adhesive that is configured to be applied to the wall and the pipe.

According to yet another aspect of the invention, an article for covering a gap in a wall or other surface comprises a substrate layer, a metallic mesh layer embedded within said substrate layer, and an adhesive layer directly applied to one surface of the substrate layer, wherein the adhesive layer comprises an adhesive that is configured to be applied to the wall.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 is a front elevation view of the pipe covering of FIG. 1.

FIG. 4 is a rear elevation view of the pipe covering of FIG. 1.

FIG. 5 is an enlarged side elevation view of the pipe covering of FIG. 1.

Figure 1:
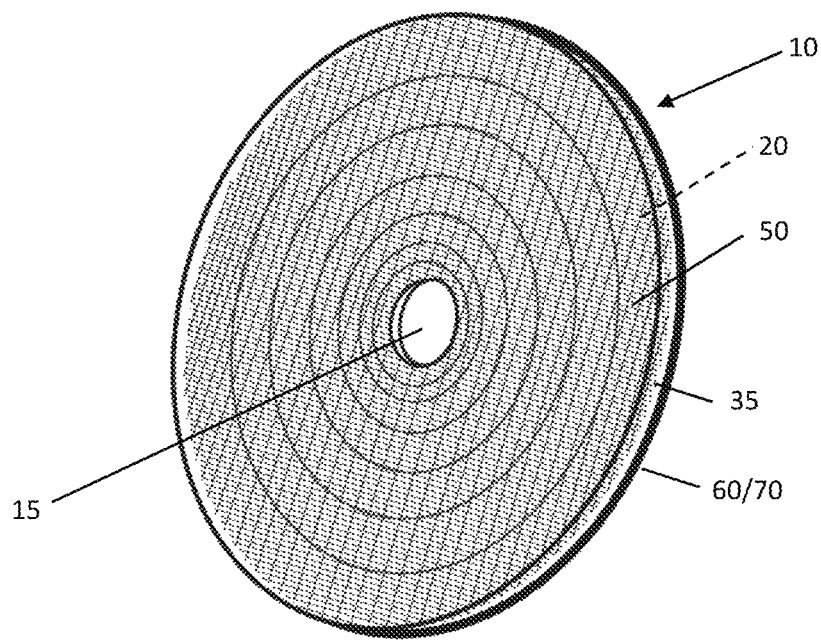
FIG. 1 is a front isometric view of a pipe covering according to one exemplary embodiment of the instant invention.
Figure 2:
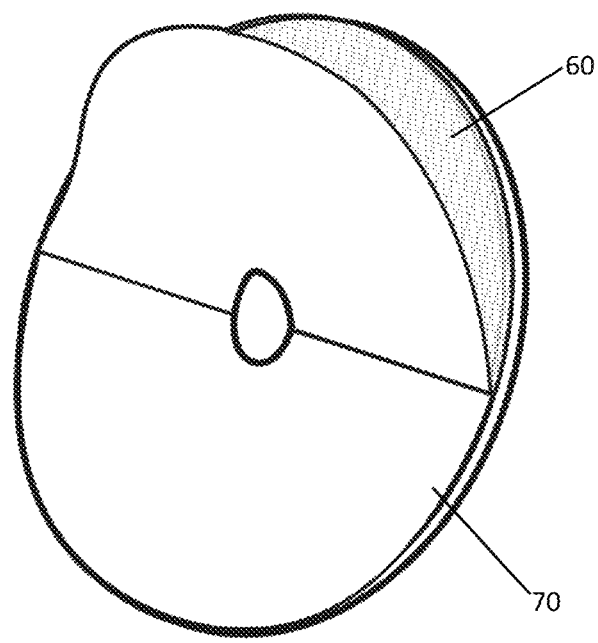
FIG. 2 is a rear isometric view of the pipe covering of FIG. 1.

The figures are not necessarily drawn to scale.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Referring now to one exemplary embodiment of a pipe covering assembly 10 shown in FIGS. 1-6, the pipe covering assembly 10 has an annular or circular shape, however, the shape of the pipe covering assembly 10 may vary, and could be oval, square or rectangular, for example. The pipe covering assembly 10 could have a flat shape, as shown, or a convex or concave shape to mimic an ornamental escutcheon. The pipe covering assembly 10 may also be referred to herein as a pipe cover, or more generally as an article.

The pipe cover 10 includes a plurality of layers that are adhered or otherwise connected together to form a single unit. Each layer has the same overall outer shape, although this detail is optional and could vary. A hole is formed in every layer of the pipe cover 10, and the holes are co-aligned to form a central hole 15. The central hole 15 may be circular, as shown, or may take another shape. Hole 15 may be omitted, if so desired.

The pipe cover 10 generally comprises a mesh layer 20 that is encased or embedded in a substrate layer 35 comprising a flexible liquid resin. Alternatively, the mesh layer 20 may be attached to an exterior surface of the substrate layer 35. The substrate layer 35 comprises a front resin layer 30 and a rear resin layer 40. Alternatively, the substrate layer 35 may not comprise individual layers and may comprise a single layer having a front face 30 and a rear face 40. A sticker 50 is directly applied to the front resin layer 30 (or face 30). The rear side of the sticker 50 may be adhesive backed for applying to the front resin layer 30. The sticker 50 comprises a plurality of concentric rings 55 printed thereon, whereby the rings 55 represent a range of pipe diameters (see, e.g., FIG. 7). It is noted that the rings 55 are visible in FIG. 6 due to the transparent nature of resin layer 30. An adhesive layer 60 in the form of double-sided tape is directly applied to the rear resin layer 40 (or face 40). A removable release layer 70 is directly applied to the rear face of the adhesive layer 60. The release layer 70 is shown partially removed in FIGS. 2 and 6.

Referring now to the composition of the individual layers and components of the pipe cover 10, the mesh layer 20 comprises a stainless steel mesh material having a 0.5 mm thickness. The gauge of the mesh may be 18-22, for example. Mesh layer 20 may also be composed of copper, steel wool, galvanized steel, fiberglass, copper wool, etc. In the process of assembling and manufacturing the pipe covering, the mesh layer 20 is encased in the substrate layer 35 during the curing process. This process may vary though.

The substrate layer 35 comprises a pre-cured translucent flexible liquid resin. The resin material may be urethane, for example, or any other material that is known to those skilled in the art. Alternatively, the substrate layer 35 may comprise a plastic material, rubber material or metallic material, for example. The substrate layer 35 may comprise either one layer or two different layers 30 and 40. The substrate layer 35 may have a total thickness of 1.58 mm, for example. The front face or layer 30 of the substrate layer 35 may be paintable or may be pre-painted in white or any other desired color.

The sticker 50, which may also be referred to herein as a printed layer, comprises a transparent vinyl material having an acrylic based adhesive disposed on its rear facing side for being adhered to the front face/layer 30 of the substrate layer 35. The sticker 50 may have a thickness of 0.4 mm, for example. A plurality of concentric rings 55 are printed on the front face of the sticker 50. The rings 55 represent a range of pipe diameters.

Figure 7:
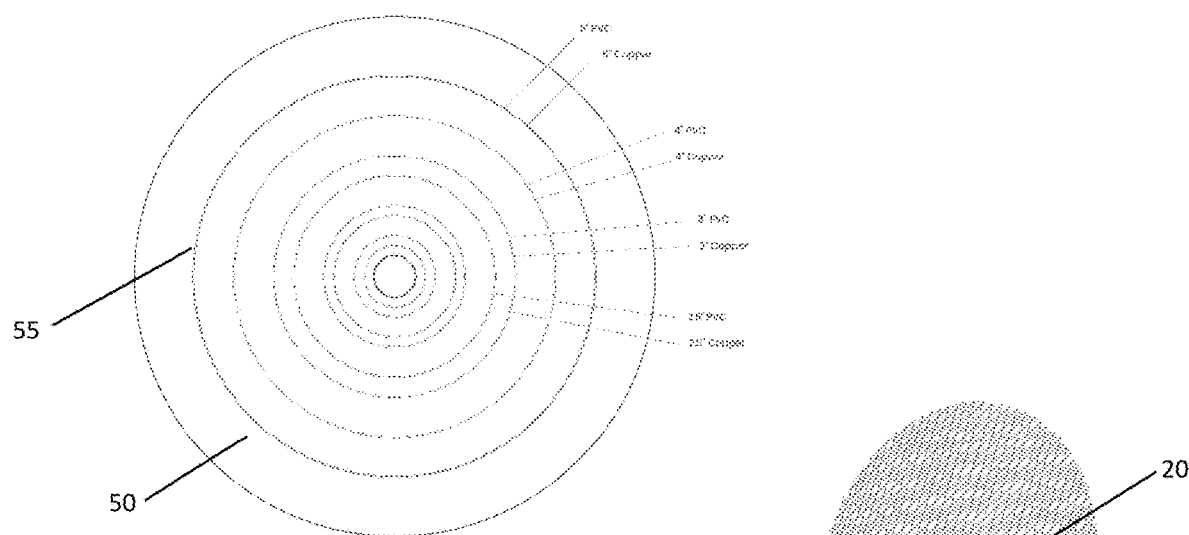
FIG. 7 is a front elevation view of a sticker of the pipe covering of FIG. 1.
Figure 6:
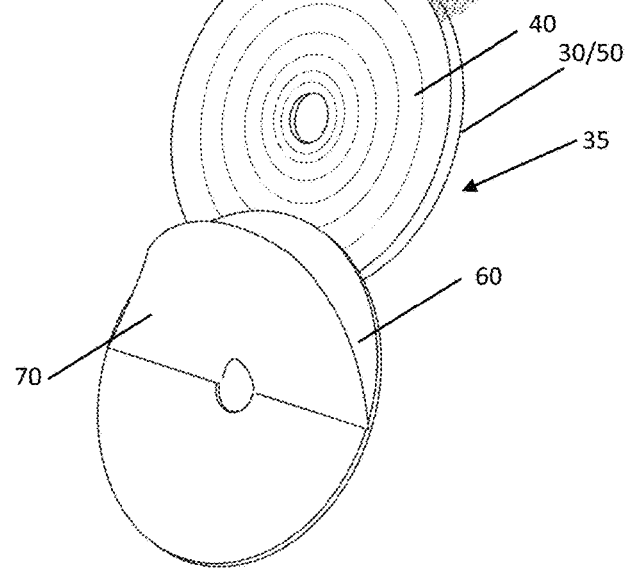
FIG. 6 is an exploded view of the pipe covering of FIG. 1.

The rings 55 are provided as a handy guide for a user. Depending upon the diameter of the pipe to which the pipe cover 10 is being applied, a user can cut the pipe cover 10 using scissors or other implement to the correct size using the rings 55 as a guide. For example, if the pipe has a 5 inch diameter (127 mm), the user would cut the pipe cover 10 along the ring 55 corresponding to a 5 inch diameter pipe. FIG. 7 shows various ring sizes to complement various pipe diameters, e.g., 2.5 inch, 3 inch, etc. The rings 55 could be replaced by other indicia. Alternatively, the rings 55 may be omitted in their entirety, and the pipe coverings 10 could be provided in a kit form including a plurality of pipe coverings 10 having a central hole 15 of varying diameter.

The adhesive layer 60 comprises a transparent double-sided tape manufactured by 3M, for example, having an acrylic based adhesive. The release layer 70 comprises a polyethylene material which is releasable from the adhesive layer 60. The adhesive layer 60 and release layer 70 together have a thickness of 0.4 mm, for example.

In an alternative embodiment, the sticker 50 may be omitted and the concentric rings 55 may be printed on the front resin layer (or face) 30 of the substrate layer 35. In yet another alternative embodiment, the concentric rings 55 may be printed on the release layer 70, adhesive layer 60 or rear layer 40 of substrate layer 35.

Turning now to one exemplary method of forming the pipe cover 10, a large sheet of steel mesh is placed in a rectangular or square mold. Urethane material is then poured into the mold and over the steel mesh sheet. Once the urethane cures, a double sided adhesive sheet is adhered to one side of the cured sheet. The cured sheet is then die cut into a circular form (optional). The sticker 50 is then applied to the die cut sheet to form the pipe cover 10.

Turning now to one exemplary method for using the pipe cover 10, a user first measures the diameter of the pipe. The user then cuts the pipe cover 10 along one of the rings 55 that corresponds to the measured diameter of the pipe. The user then removes the release layer 70, and positions the pipe cover 10 about the diameter of the pipe, and applies the exposed rear adhesive surface of the adhesive layer 60 to the wall through which the pipe extends. The adhesive surface of the adhesive layer 60 may also be applied to the outer diameter of the pipe.

The pipe cover 10 then conceals the opening in the wall surrounding the pipe, thereby inhibiting the entrance of rodents through that opening. The mesh layer 20 is particularly difficult for the rodents to penetrate. The user may or may not paint the front face/layer 30 of the substrate layer 35, if so desired, so that the pipe cover 10 matches the wall to which is it applied. The pipe cover 10 may be treated with a rodenticide or other chemical or substance.

The pipe cover 10 may be applied to baseboard piping, water lines, gas lines, cracks and holes in foundations, openings adjacent vents and windows, or gaps in trim and molding, for example.

It will be appreciated that the various shapes, materials and dimensions may vary from that which is shown and described.

It will also be appreciated that certain features of the pipe covering may be selected for ornamental design and are not dictated by practical function. For example, the shape of the pipe covering, and other features may be selected based to some degree or entirely according to aesthetic preferences. Accordingly, design elements of these features can be varied and selected while maintaining functionality, such that a variety of ornamental configurations are available with substantially the same function or performance. The ornamental design of the pipe covering may be protected separately in one or more U.S. design patent applications.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pipe covering assembly for covering a gap defined between an exterior surface of a pipe and an opening in a wall through which the pipe extends, said pipe covering assembly comprising:
   a substrate layer having a through-hole for receiving the pipe, wherein a perimeter of the through-hole is continuous and uninterrupted;
   a metallic mesh material layer either attached to or contained within said substrate layer; and
   an adhesive layer directly applied to one surface of the substrate layer, wherein the adhesive layer comprises an adhesive that is configured to be applied to the wall and the pipe.

2. The pipe covering assembly of claim 1, wherein the substrate layer comprises two layers, and the metallic mesh layer is sandwiched between the two layers.

3. The pipe covering assembly of claim 1, wherein the metallic mesh material layer is embedded within said substrate layer.

4. The pipe covering assembly of claim 1, further comprising a release layer applied to the adhesive layer.

5. The pipe covering assembly of claim 1, wherein the substrate comprises a translucent flexible liquid resin.

6. The pipe covering assembly of claim 1, wherein the metallic mesh material layer comprises stainless steel.

7. The pipe covering assembly of claim 1, wherein the substrate layer, metallic mesh material layer and the adhesive layer have a common outer diameter.

8. The pipe covering assembly of claim 1 further comprising a plurality of concentric rings either printed on a front surface of the substrate layer or disposed on a layer that is applied to the front surface of the substrate layer, each ring of the concentric rings corresponding to a pre-determined pipe diameter.

9. A kit comprising a plurality of the pipe covering assemblies of claim 1, wherein each pipe covering assembly has a different outer diameter.

10. A pipe covering assembly for covering a gap defined between an exterior surface of a pipe and an opening in a wall through which the pipe extends, said pipe covering assembly comprising:
- a substrate layer having a front surface, a rear surface, and a through-hole for receiving the pipe, wherein a perimeter of the through-hole is continuous and uninterrupted;
- a mesh material layer either attached to or contained within said substrate layer;
- an adhesive layer directly applied to the rear surface of the substrate layer, wherein the adhesive layer comprises an adhesive that is configured to be applied to the wall and the pipe; and
- a plurality of concentric rings either printed on the front surface of the substrate layer or disposed on a printed layer that is applied to the front surface of the substrate layer, each ring of the concentric ring corresponding to a pre-determined pipe diameter.

11. The pipe covering assembly of claim 10, wherein the substrate layer comprises two layers, and the mesh material layer is sandwiched between the two layers.

12. The pipe covering assembly of claim 10, wherein the mesh material layer is embedded within said substrate layer.

13. The pipe covering assembly of claim 10, wherein the mesh material layer comprises stainless steel.

14. The pipe covering assembly of claim 10, wherein the substrate comprises a translucent flexible liquid resin.

15. The pipe covering assembly of claim 10, wherein the plurality of concentric rings are printed on the printed layer, and the printed layer comprises an adhesive backed sticker that is applied to the front surface of the substrate layer.

16. The pipe covering assembly of claim 10, wherein the substrate layer, mesh material layer and the adhesive layer have a common outer diameter.

17. The pipe covering assembly of claim 10, wherein the through hole is circular and a perimeter of the pipe covering assembly is circular.

18. A kit comprising a plurality of the pipe covering assemblies of claim 10, wherein each pipe covering assembly has a different outer diameter.

19. The pipe covering assembly of claim 1, wherein the substrate layer is treated with a rodenticide.

20. The pipe covering assembly of claim 10, wherein the substrate layer is treated with a rodenticide.

21. The pipe covering assembly of claim 1, wherein the metallic mesh layer is attached to an exterior surface of the substrate layer on a side opposite the adhesive layer.

* * * * *